United States Patent
Berry (10) Patent No.: US 11,016,462 B2
(45) Date of Patent: May 25, 2021

(54) METHOD, SYSTEM AND APPARATUS FOR COMMUNICATION OF OPERATIONAL STATUS OF CONTROLLERS ON A VEHICLE

(71) Applicant: JAGUAR LAND ROVER LIMITED, Warwickshire (GB)

(72) Inventor: Adrian Berry, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 0 days.

(21) Appl. No.: 16/342,356

(22) PCT Filed: Oct. 18, 2017

(86) PCT No.: PCT/EP2017/076565
§ 371 (c)(1),
(2) Date: Apr. 16, 2019

(87) PCT Pub. No.: WO2018/073287
PCT Pub. Date: Apr. 26, 2018

(65) Prior Publication Data
US 2019/0243326 A1    Aug. 8, 2019

(30) Foreign Application Priority Data
Oct. 20, 2016 (GB) .................. 1617734

(51) Int. Cl.
*G05B 19/042* (2006.01)
*B60W 50/02* (2012.01)
*B60W 50/14* (2020.01)

(52) U.S. Cl.
CPC ..... *G05B 19/0428* (2013.01); *B60W 50/0225* (2013.01); *B60W 50/14* (2013.01);
(Continued)

(58) Field of Classification Search
CPC ...... G05B 19/0428; G05B 2219/24047; G05B 2219/24208; G05B 2219/25144;
(Continued)

(56) References Cited

U.S. PATENT DOCUMENTS 4,546,426 A * 10/1985 Hafner .................. G05D 3/18
                                              318/561
5,339,782 A *  8/1994 Golzer ................. F02D 11/107
                                              123/399
(Continued)

FOREIGN PATENT DOCUMENTS

CN      104329509 A     2/2015
EP       1041471 A2    10/2000
(Continued)

OTHER PUBLICATIONS

Combined Search and Examination Report under Sections 17 and 18(3) for Application No. GB1617734.7 dated Apr. 28, 2017.
(Continued)

*Primary Examiner* — Ramesh B Patel
(74) *Attorney, Agent, or Firm* — Carlson, Gaskey & Olds (57) ABSTRACT

An illustrative example embodiment of a method of communicating between controllers on a vehicle includes communicating a first operation request from a first controller to a second controller. The first operation request is indicative of the second controller performing a first operation. The second controller attempts to perform the first operation at a time when it cannot be performed, determines that the first operation cannot be performed, and communicates an indication that the first operation request cannot currently be satisfied. The second controller continues to attempt to perform the first operation at a subsequent time.

19 Claims, 4 Drawing Sheets

(52) U.S. Cl.
CPC .............. *G05B 2219/24047* (2013.01); *G05B 2219/24208* (2013.01); *G05B 2219/25144* (2013.01); *G05B 2219/2637* (2013.01)

(58) Field of Classification Search
CPC .......................... G05B 2219/2637; G05B 7/02; G05B 19/042; B60W 50/0225; B60W 50/14; B60W 20/00; B60W 2050/0008
See application file for complete search history.

(56) References Cited

U.S. PATENT DOCUMENTS

| | | | | |
|---|---|---|---|---|
| 5,342,120 | A * | 8/1994 | Zimmer | B60T 8/32 303/113.2 |
| 6,021,418 | A * | 2/2000 | Brandt | G06F 9/451 715/205 |
| 9,545,927 | B2 * | 1/2017 | Fairgrieve | B60T 7/12 |
| 9,815,470 | B2 * | 11/2017 | Luther | B60W 30/188 |
| 10,233,028 | B2 * | 3/2019 | Combs | B65G 43/00 |
| 10,446,037 | B2 * | 10/2019 | Kentley-Klay | G08G 1/202 |
| 2002/0012048 | A1 * | 1/2002 | Yamagishi | H04N 1/00477 348/207.99 |
| 2003/0222982 | A1 * | 12/2003 | Hamdan | H04N 7/181 348/148 |
| 2004/0047305 | A1 * | 3/2004 | Ulupinar | H04W 52/40 370/320 |
| 2004/0173296 | A1 | 9/2004 | White et al. | |
| 2007/0016340 | A1 * | 1/2007 | Soudier | H02P 29/0241 701/1 |
| 2007/0085510 | A1 * | 4/2007 | Asada | H02P 9/02 322/28 |
| 2011/0313640 | A1 * | 12/2011 | Hioki | F02D 41/28 701/104 |
| 2012/0281782 | A1 * | 11/2012 | Matsutani | H04B 1/1607 375/285 |
| 2014/0114516 | A1 * | 4/2014 | Badger | B60H 1/2218 701/22 |
| 2014/0261317 | A1 | 9/2014 | Loucks et al. | |
| 2015/0269038 | A1 * | 9/2015 | Perez | G06F 11/2041 714/5.1 |
| 2016/0031440 | A1 * | 2/2016 | Youn | B60W 10/08 701/22 |
| 2018/0069578 | A1 * | 3/2018 | Lee | H04B 1/406 |

FOREIGN PATENT DOCUMENTS

| | | |
|---|---|---|
| EP | 1371524 A2 | 12/2003 |
| GB | 2155097 A | 9/1985 |
| JP | 2012123553 A | 6/2012 |

OTHER PUBLICATIONS

International Search Report and Written Opinion of the International Searching Authority for International application No. PCT/EP2017/076565 dated Jan. 4, 2018.

\* cited by examiner

METHOD, SYSTEM AND APPARATUS FOR COMMUNICATION OF OPERATIONAL STATUS OF CONTROLLERS ON A VEHICLE

TECHNICAL FIELD

The present disclosure relates to a method and apparatus and particularly, but not exclusively, to an apparatus and method which operate responsive to commands. Aspects of the invention relate to a vehicle, a method, to an apparatus, to a system and to computer software.

BACKGROUND

Vehicles have complex electrical systems often implemented as systems, such as a high-voltage electrical system in a hybrid vehicle, which include a system controller communicably linked to one or more sub-controllers, such as device controllers. The system controller issues requests or commands to the sub-controllers which may instruct the sub-controllers to, for example, enter a mode of operation to control an associated device to perform an operation. If a sub-controller encounters an error, then an error message is sent back to the system controller which takes appropriate action. In a complex system, an operation performed by one sub-controller may need to be completed before an operation can successfully be performed by another sub-controller. Thus the system controller must synchronise the timing of requests to the various sub-controllers in order for a sub-controller to not determine that an error has been encountered when attempting to perform an operation before completion of another operation. The requirement for synchronisation by the system controller increases complexity since the system controller must be aware of timing constraints of all sub-controllers.

Furthermore, when developing vehicles, it is common to assemble a vehicle system from multiple parts of sub-systems which may not have been used together before, or where the system is formed of sub-systems including newly-developed software. In order for the system to function, it is not necessary for the purpose of development that the system is entirely functional i.e. during development some partial functionality is acceptable. For example, where a sub-system is used with a system controller for the purpose of development, the system controller may not be fully aware of timing constraints of that sub-system. Therefore an error may be generated by the sub-system which causes the system as a whole to cease functioning. It is onerous, for the purpose of development, to eliminate errors by, for example, modifying values or requested modes in the system controller software to avoid error messages being received.

It is an object of embodiments of the invention to at least mitigate one or more of the problems of the prior art.

SUMMARY OF THE INVENTION

Aspects and embodiments of the invention provide a method, an apparatus, a system, a vehicle and computer software as claimed in the appended claims.

According to an aspect of the invention, there is provided a method, comprising communicating a request from a first control means to a second control means, and communicating from the second control means to the first control means a response indicative that the request cannot currently be satisfied. The indication may not be indicative of an error. Advantageously, the response informs the first control means of the second control means not currently being able to support the request, wherein the response may not cause an error routine to be followed by the first control means.

According to an aspect of the invention, there is provided a method, comprising communicating, from first control means to a second control means, a first operation request indicative of the second control means performing a first operation, determining, at the second control means, whether the first operation can be performed, communicating, if the operation cannot be performed, from the second control means to the first control means, an indication that the first operation request cannot currently be satisfied, and continuing, by the second control means, to attempt to perform the first operation. Advantageously a tolerance of the first control means may be improved to requesting operations which may not be supported by the second control means. Advantageously, a timing requirement of the first control means is reduced. The second control means may, beneficially, perform the requested operation at an appropriate time.

A method as described above, wherein:

the first control means is a first controller or control unit; and the second control means is a second controller or control unit. The first and second controllers may be electrically coupled to communicate.

The second control means may continue to attempt to perform the first operation for a predetermined period of time. Advantageously the second control means continues to attempt to perform the first operation, such that if condition(s) preventing performance of the first operation change, the first operation request is fulfilled. Thus the second control means is favourably given time to fulfil the first operation request. The method may comprise communicating an indication of an error from the second control means if the first operation cannot be performed on expiry of the predetermined period of time. Advantageously, the error is only signalled if it is eventually determined that the first operation cannot finally be performed.

An indication of the error may be outputted from the first control means to an operator. Advantageously, only when the error is finally signalled is the operator informed.

In an embodiment, the method comprises communicating a second operation request from the first control means to third control means that is indicative of the third control means performing a second operation and determining at the third control means that performing the second operation is dependent on the first operation being performed by the second control means. Advantageously multiple operation requests may be communicated in a short period of time, that is before one or more operations have been completed.

The method may comprise communicating the indication that the second operation cannot currently be performed from the third control means to the first control means, determining at the third control means that the first operation has been performed by the second control means and performing the operation at the third control means. Advantageously, the third control means awaits completion of the first operation without signalling an error, then performs the second operation when possible.

The second control means may be arranged to control a device such that the first operation request is a request to enter an identified mode of operation of the device. Advantageously, the second control means may enter a 'not capable' operating mode for the device and wait until the device is capable of performing the operation, instead of immediately reporting an error to the first control means.

The method may comprise determining whether the first operation can be performed at the second control means by the second control means determining whether the mode of operation is supported by the device or by determining a status of one or more inputs. Advantageously systems may be assembled from control means not having full compatibility, such as, although not exclusively, for development purposes.

The method may comprise determining whether the first operation can be performed at the second control means by determining a status of one or more inputs. The one or more inputs may be one or more inputs provided to the device. Advantageously the second control means may await the one or more inputs having satisfactory values or states to perform the first operation.

The second control means may be associated with a high voltage (HV) system of an electric vehicle. Advantageously the first operation associated with the HV system may await being possible, such as, although not exclusively, a charging of one or more components of the HV system.

According to another aspect of the invention, there is provided an apparatus comprising communication means for receiving operation requests and transmitting responses, control means for determining whether a received operation request can be satisfied, arranging, if the received communication cannot be satisfied, to cause the communication means to transmit an indication of the operation request currently not being satisfied and arranging for the control means to continue to attempt to satisfy the operation request.

An apparatus as described above, wherein:
the communication means is an electrical input; and
the control means comprises a processor. The apparatus may be a controller or control unit.

The control means may be arranged to continue to attempt to satisfy the operation request for a predetermined period of time.

The control means may be arranged to cause the communication means to communicate an indication of an error in dependence on the control means not being able to satisfy the operation request on expiry of the predetermined period of time.

The apparatus may be arranged to control a device with the operation request being a request to enter an identified mode of operation of the device.

In an embodiment, the apparatus is arranged to determine whether the mode of operation is supported by the device and to communicate the indication that the operation request cannot currently be satisfied.

According to a further aspect of the invention, there is provided a system comprising a first control means, a second control means communicably coupled to the first control means such that the first control means is arranged to communicate to the second control means an operation request indicative of a first operation to be performed by the second control means and the second control means is arranged to determine if the operation request can be currently satisfied and, if not, to communicate to the first control means an indication that the operation request cannot currently be satisfied, wherein the second control means is arranged to continue to attempt the operation.

A system as described above, wherein:
the first control means is a first controller; and
the second control means is a second controller. The first and second control means may be electrically coupled to communicate.

The second control means may be arranged to continue to attempt to perform the operation for a predetermined period of time.

The second control means may be arranged communicate an indication of an error to the first control means if the second control means cannot satisfy the operation request on expiry of the predetermined period of time. The first control means may be arranged to output an indication of this error or cause an indication of the error to be output to an operator.

In an embodiment, the system comprises third control means communicably coupled with at least the first control means. The third control means may be a third controller.

The first control means may be arranged to communicate to the third control means a second operation request indicative of a second operation, with performance of the second operation request by the third control means dependent upon the first operation being performed by the second control means. The third control means may be arranged to communicate to the first control means an indication that the second operation request cannot currently be satisfied, to determine that the first operation has been performed by the second control means, and to perform the second operation.

The second control means may be arranged to control a device such that the first operation request is a request to enter an identified mode of operation of the device, and determine whether the mode of operation is supported by the device.

The system may comprise the second control means arranging to determine a status of one or more inputs, to determine whether the first operation can be performed, wherein the one or more inputs are one or more inputs provided to the device.

The second control means may be associated with a high voltage system of an electric vehicle.

According to a still further aspect of the invention, there is provided a vehicle arranged to perform a method, comprising an apparatus or comprising a system according to an aspect of the invention.

According to yet another aspect of the invention, there is provided computer software which, when executed by a computer, is arranged to perform a method according to an aspect of the invention. This computer software may be stored on a computer readable medium. The computer software may be tangibly stored on the computer readable medium. The computer readable medium may be non-transitory.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
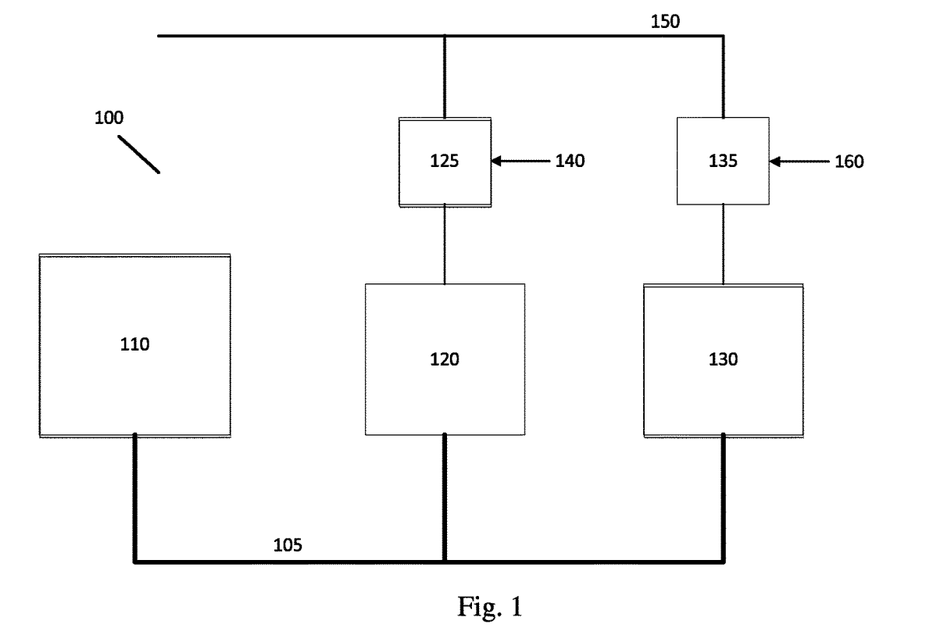
FIG. 1 shows a system according to an embodiment of the invention.

FIG. 1 illustrates a system 100 according to an embodiment of the invention. The system 100 may be a system associated with a high-voltage (HV) system of a vehicle, which may be a hybrid vehicle. The HV system may comprise a HV bus 150 which may operably have a voltage of 60V or more present thereon. The vehicle may be a wheeled vehicle which is capable of being propelled, at least partly, by one or more electric machines.

The system 100 comprises a first control means 110 and a second control means 120. In some embodiments, the system 100 may comprise a third control means 130. It will be appreciated that the number of control means 110, 120, 130 shown in FIG. 1 is not limiting to embodiments of the invention. The system 100 comprises a communication means 105. The communication means 105 operably allows the first and second control means 110, 120 and, in some embodiments the third control means 130, to communicate. In some embodiments of the invention the communication means 105 allows messages to be communicated amongst the control means 110, 120, 130. Each message may be communicated in the form of one or more data packets conveyed by the communication means 105. The communication means 105 may be a communication bus 105 of the vehicle. The communication bus 105 may operate according to a predetermined protocol such as CANBus in some embodiments. In other embodiments the communication bus 105 may be operable according to an IP-based protocol such as Ethernet or another protocol such as Flex Ray. It will be appreciated that other protocols may be envisaged.

Figure 2:
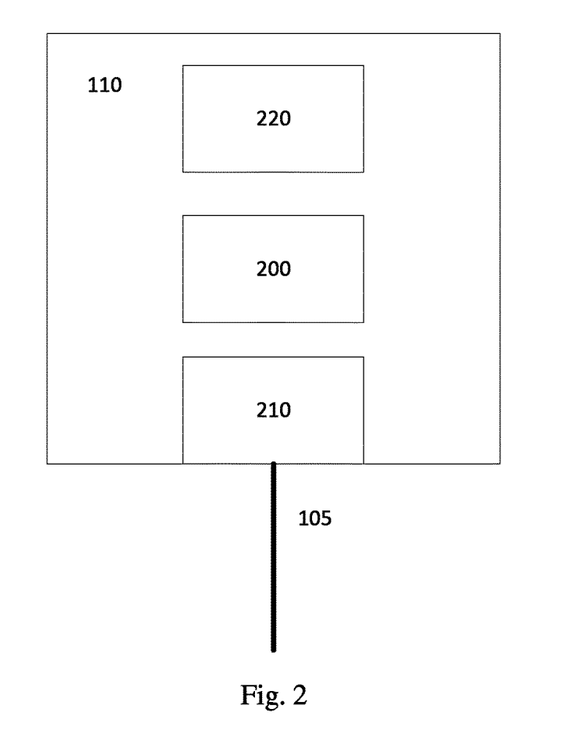
FIG. 2 shows a controller according to an embodiment of the invention.

FIG. 2 schematically illustrates an example construction of the first control means 110. It will be appreciated that the second and third control means 120, 130 may have identical or similar constructions. The first control means 110 may be a system controller or system control unit 110. The second and third control means 120, 130 may similarly be second and third controllers or control units 120, 130.

The first control unit 110 comprises a processing means 200, communication means 210, and memory means 220. The processing means 200 may be one or more processors 200 which operably execute computer executable instructions which may be stored in the memory means 220. The memory means 220 may be one or more memory devices and may comprise one or both of Read Only Memory ROM or Random Access memory (RAM). The communication means 210 may be a communication device 210. The communication device 210 is interfaced to the communication bus 105 of the system 100. The communication device 210 is operable according to the communication protocol of the communication bus 105, such as Ethernet etc. The communication device 210 is communicably coupled to the processor 200 to send and receive data to and from the processor external to the first control unit 110, such as with the second and third control units 120, 130.

The first control unit 110 may be a system control unit 110. The system control unit 110 is responsible for managing operation of the system 100. In particular, the system control unit 110 is operable to issue requests to other components of the system 100, such as the second and third control units 120, 130. Each request may identify the intended recipient(s) i.e. the one or more entities to which the request is addressed, such as one or more of the second control unit 120 and the third control unit 130 in FIG. 1. The request may instruct the recipient to enter an identified mode of operation, configure the recipient or instruct the recipient to control an associated device according to the request i.e. to control the device to perform an operation as identified in the request. It will be appreciated that other requests may be envisaged.

The system control unit 110 is further arranged to receive responses from other components of the system 100, such as from the second and third control units 120, 130. Thus it will be appreciated that communication means of the second and third control units 120, 130 receive the requests from the system control unit 110 and send responses thereto.

The response may be indicative of the respective control unit 120, 130 having performed an operation corresponding to the request issued by the system control unit 110. The response may also be indicative of an error or fault associated with the respective control unit 120, 130. For example, the second control unit 120 having detected a fault condition. In embodiments of the invention the response may be indicative of a component of the system 100, such as one of the second and third control units 120, 130, not currently being capable of performing the requested operation. In embodiments of the invention the system control unit 110 does not treat such a response as being indicative of an error or fault with the sender. Such a response will be referred to as a 'not capable' response. Instead the 'not capable' response is indicative of the sender, such as the second control unit 120, not being able to fulfil the instructed request at the present time, as will be explained. The sender may become able to fulfil the instructed request at a later time, thus the not capable response may not be deemed to be indicative of a fault or error. Whilst the control unit is waiting to perform the requested operation, it may be considered to be in a 'not capable' operating mode.

In some instances, the system control unit 110 may issues a plurality of requests simultaneously, or at least within a short period of time, to multiple components of the system 100. Some of the operations instructed by said requests may be inter-dependent i.e. an operation performed by one component, such as the second control unit 120, may require that an operation be previously performed i.e. completed by another component of the system, such as the third control unit 130. In this instance the not capable response may indicate that the second control unit 120 is waiting to perform the requested operation.

One or more control units in the system 100 may be associated with a respective device 125, 135. The HV bus 150 may comprise one or more electrical conductors for providing HV electrical supply to one or more devices. In the embodiment illustrated in FIG. 1 the HV bus 150 is associated with first and second devices 125, 135. The first device 125 may be, for example, an interlock device 125 for controlling the voltage present on the HV bus 150. The second device 135 may be, for example, a DCDC convertor 135. The DCDC convertor 135 is responsible for providing a DC voltage supply of a different DC voltage than provided by the HV bus 150. For example, the DC voltage supply may be provided to power electronics, such as comprising an inverter, driving an electric machine (not shown) of the vehicle which may be associated with a drivetrain of the vehicle to operate, at least during some periods, as an electric motor. It will be appreciated that not every control unit in the system may be associated with a device. At least some control units are provided with one or more inputs 140, 160 indicative of one or more conditions. For example, an input 140 may be provided to the second control unit 140 indicative of a status of a HV battery. The third control unit 130 may be provided with an input 160 indicative of a voltage on the HV bus 150. One or both of the second and third control units 120, 130 may be arranged to determine whether the requested operation can be performed in dependence on the one or more inputs 140, 160. In embodiments of the invention, for example the second control unit 120 may determine whether it, or the associated device 125, is not capable of fulfilling a received request in dependence on the one or more inputs 140. Therefore the 'not capable' response may be transmitted from the second control unit 120 in dependence on the one or more inputs 140. Similarly the third control unit 130 may determine if a request can be fulfilled on the basis of its one or more inputs 160. It will be appreciated that a plurality of inputs may be provided to one or more control units 120, 130 of the system 100.

Figure 3:
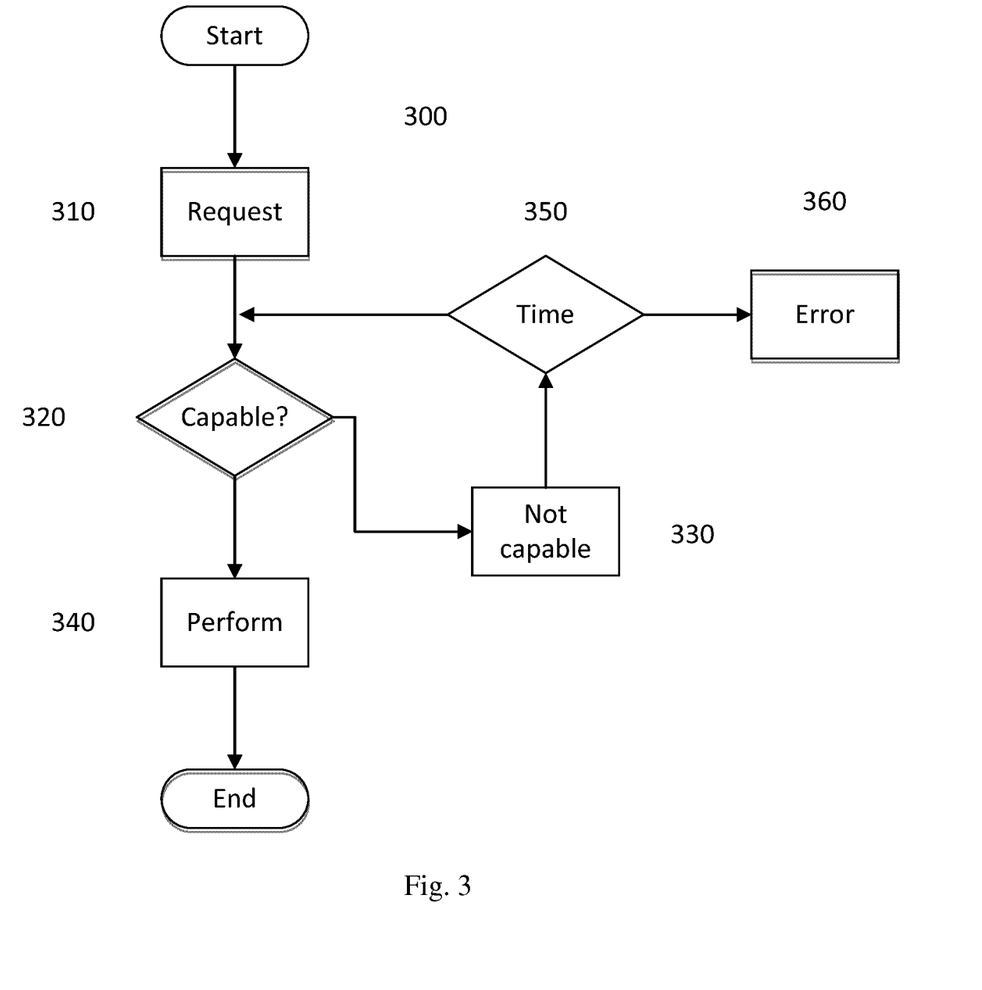
FIG. 3 shows a method according to an embodiment of the invention.

A method 300 which may be performed by the system 100 is illustrated in FIG. 3 which will be described with reference particularly to FIG. 1.

In step 310 a request is communicated. In particular, in some embodiments, the system control unit 110 is arranged to communicate the request to another component of the system. Step 310 may comprise the first control unit 110 transmitting the request. The request may be communicated to the second control unit 120 via the communication bus 105 whereupon it is received. The request may be an operation request indicative of a first operation to be performed by the second control unit 120. The operation may be the second control unit 120 entering a mode or configuration state identified within the request. The operation request may be an operation to be performed by the device 125 associated with the second control unit 120, such as a request for the electric machine to operate as an electric motor, for example. It will be appreciated that the request may be communicated to the third control unit 130 in step 310. It will also be appreciated that the request may be communicated to a plurality of recipients, such as the second and third control units 120, 130 to perform the same operation, In step 320 the one or more recipients of the request are arranged to determine if the request can be satisfied. For example, the second control unit 120 is arranged to determine if the request received in step 310 can be satisfied at the present time. In step 320 the determination may be performed on the basis of one or more of the one or more inputs 140 to the second control unit 120, a current state of the second control unit 120 or a current state of the device 125 associated with the second control unit 120, such as the DCDC convertor.

If the request can be satisfied, such as a requested mode of operation being entered, or an operation being performed by the second control unit 120 or associated device 125, then the method 300 moves to step 340 and the requested operation is performed.

If, however, the request cannot currently be satisfied, then method moves to step 330. Step 330 is indicative of at least some of the one or more recipients of the request not being able to fulfil the request at the present time.

In step 330 a not capable response is communicated to the origin of the request, such as the system control unit 110 in FIG. 1. The not capable response may be a message communicated via the communication bus 105. The not capable response provides an indication that the requested operation cannot currently be satisfied. The not capable response is not an error message indicative of a fault or error condition of the second control unit 120 or associated device 125, but is indicative of, at least temporary, non-fulfilment of the request.

The method 300 then returns to step 320, wherein it is again determined if the request can be satisfied. Thus, in the example of FIG. 1, the second control means 120 is arranged to continue to attempt to perform the operation after having communicated the not capable response. It will be appreciated that a delay period may be introduced between steps 330 and 320 i.e. the method loops, in some embodiments, with a predetermined delay, between steps 320 and 330 if the request cannot be fulfilled. In further iterations of step 330 further not capable responses may be communicated to the system control unit 110, although in other embodiments only one not capable response may be sent in step 330 to the system control unit 110.

In some embodiments, the method comprises a step 350 interposing steps 330 and 320 in which it is determined whether a predetermined period of time has elapsed. The predetermined period of time may be determined from a time of receiving the request in step 310 to a time at which step 350 is performed. Thus step 350 acts as a timeout for the not capable response. If the predetermined period of time has elapsed then the method moves to step 360. If, however, the predetermined time has not elapsed, then the method returns to step 320, as described above.

In step 360 an error response indicative of an error or fault is communicated. The response may be communicated from the second control unit 120 to the system control unit 110 in step 360 in the example of FIG. 1. The error response signals to the system control unit 110 that the second control unit 120 has not been able to fulfil the request. The sender of the error response may not continue to perform the requested operation after sending the error response. As a result, the system control unit 110 is informed that an error state exists in the system 100. As a result, the system control unit 110 may output an indication of the error state. The indication may be output to an operator such as an occupant or driver of the vehicle. The vehicle may also enter a failsafe or 'limp' operating mode as a result.

Figure 4:
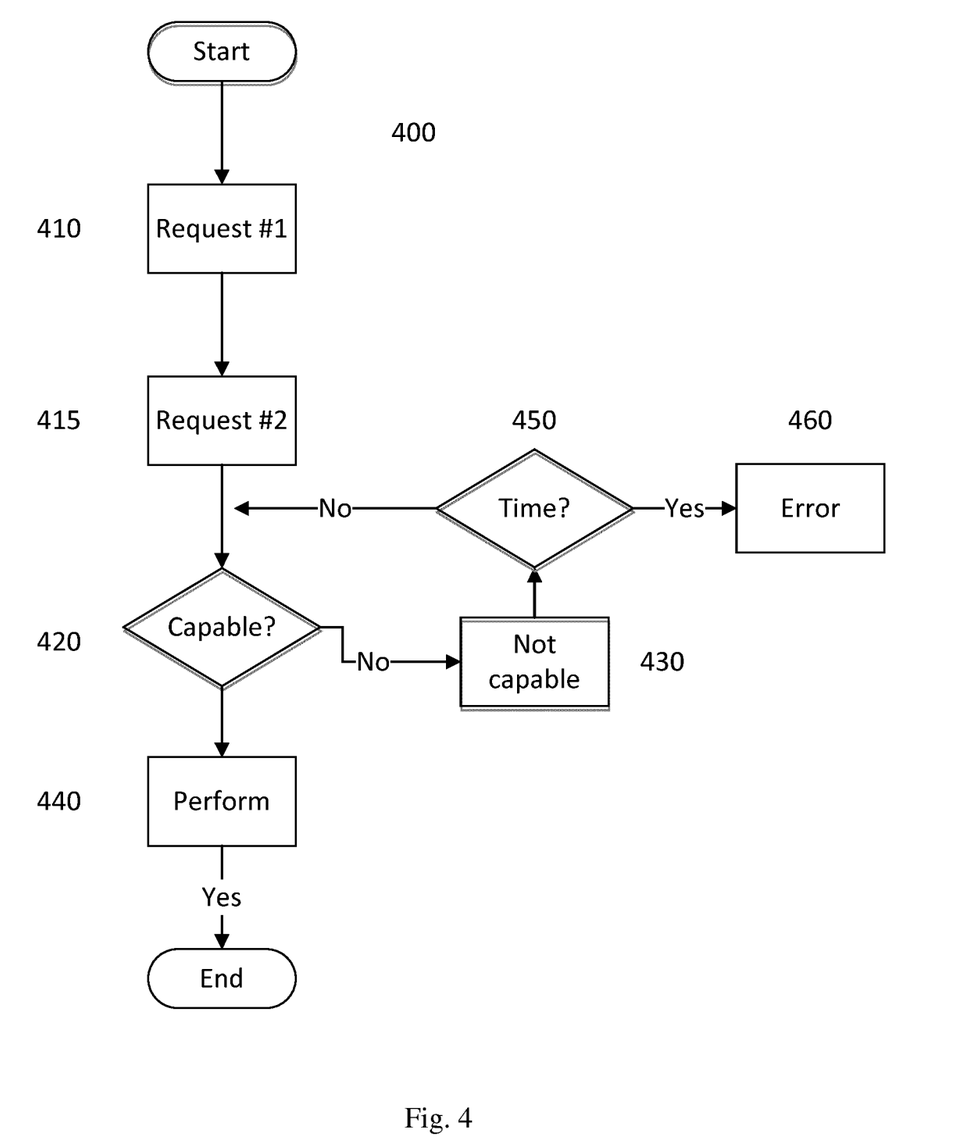
FIG. 4 shows a method according to another embodiment of the invention.

FIG. 4 illustrates a further method 400 according to an embodiment of the invention. The method 400 has similarity to the method 300 described above and a consistent numbering of steps is used for clarity. Unless otherwise described, steps have the same function as described above. In the method of FIG. 4, a plurality of requests are sent substantially simultaneously, wherein the operations indicated in at least some of the requests require completion of operations indicated in other requests. As a result, one or more control units in the system 100 respond with a not capable response, at least initially. Other control units may be able to begin to fulfil their requested operation and, on completion, this allows the not capable control units to being to fulfil their requested operations. Thus the system control unit 110 is not required to synchronise the transmission of requests within the system 100 as the not capable state 430 allows control units within the system to await the completion of operations by other control units before commencing their requested operations.

Referring to FIG. 4, in step 410 a first request is communicated to one control unit, such as the third control unit 130 as described above. In some embodiments, the third control unit 130 is associated with the DCDC convertor 135. The first request may request that the DCDC convertor 135 provides a DC voltage, such as to the electric machine of the vehicle, which is different to the DC voltage on the HV bus 150, although it will be appreciated that this is not limiting.

In step 415 a second request is communicated to another control unit, such as the second control unit 120. In some embodiments, the second control unit 120 is associated with the interlock device 125. The second request may request that the interlock device 125 is operable to cause the HV voltage to be present on the HV bus 150 i.e. that the HV bus 150 goes from a non-operational state or low-voltage state to a high-voltage state. It will be appreciated that it is necessary for the HV bus 150 to have the high-voltage present thereon for the DCDC convertor 135 to operate. It will be appreciated that steps 410 and 415 may be performed in a different order to that illustrated and may be performed simultaneously or substantially simultaneously.

In step 420 each of the second and third control units 120, 130 determines if it is capable to perform the requested operation. For each unit 120, 130 step 420 may be performed independently and substantially simultaneously i.e. in parallel. For the second control unit 120 the determination is positive in step 420, thus the method as executed by the second control unit 120 moves to step 440 where the requested operation is performed, which in the example is to control the interlock device 125 to increase the voltage on the HV bus 150. This operation may take a period of time, even if relatively short, for the operation to complete i.e. while the voltage on the HV bus 150 rises, for example due to capacitance of the HV bus 150 and connected devices.

Meanwhile, step 420 being performed by the third control unit 130 is determined to be negative owing to the input 160 to the third control unit 130 indicating that the voltage on the HV bus is not sufficient for the requested operation. Thus the third control unit 130 moves to step 430 where the not capable response is sent to the system control unit 110, which is not considered as an error, and only indicative of a temporary condition. The third control unit 130 repeats steps 420-430 whilst the voltage on the HV bus 150 rises, as indicated to third control unit 130 by input 160. The time in step 450, in some embodiments, is selected to allow the requested operation to complete under normal conditions. In some embodiments, step 450 utilises a different time period for each requested operation, such that an appropriate time period is used for each operation to complete. Once step 420 is determined to be positive by the third control unit 130 i.e. once the HV bus 150 is at a sufficient voltage, the third control unit 130 moves to step 440 where the third control unit 130, in this example, controls the DCDC convertor 135 to provide the output DC voltage. Thus it can be appreciated that a requirement for the system control unit 110 to synchronise the communication of requests to the second and third control units 120, 130 is reduced by the use of not capable messages. In other words, it is not necessary for the system control unit 110 to determine that the second control unit 120 has successfully performed its requested operation before requesting the third control unit 130 to perform an operation. In this way, operation of the system control unit 110 may be simplified.

Figure 5:
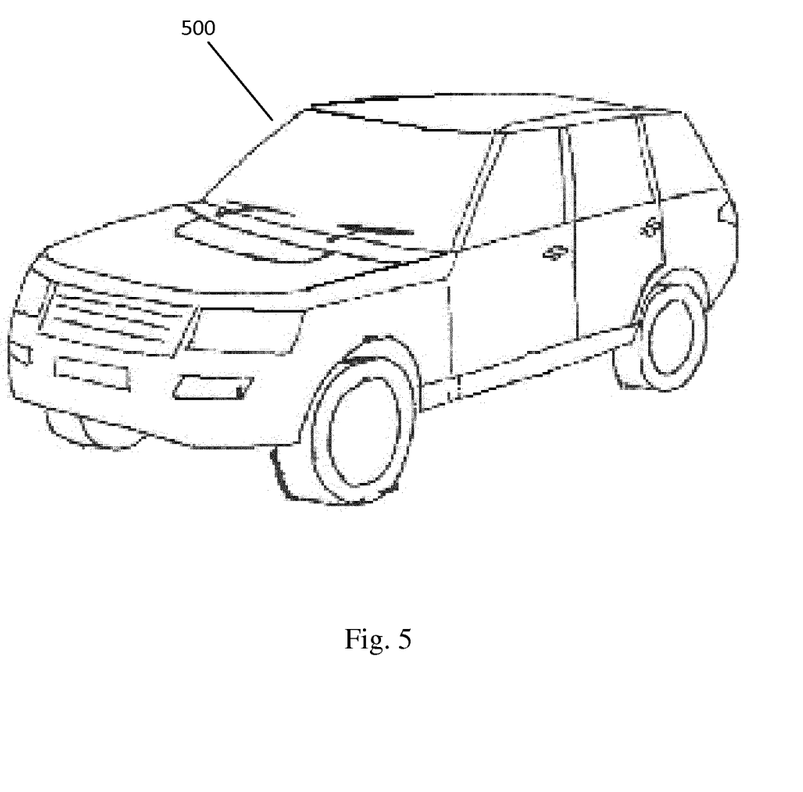
FIG. 5 shows a vehicle according to an embodiment of the invention.

FIG. 5 illustrates a vehicle 500 according to an embodiment of the invention. The vehicle may be arranged to perform a method according to an embodiment of the invention, such as shown in FIG. 3 or 4. The vehicle 500 may alternatively or additionally include an apparatus according to an embodiment of the invention, such as the system control unit 110 or one both of the second and third control units 120, 130. The vehicle 500 may comprise a system 100 according to an embodiment of the invention, such as illustrated in FIG. 1.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of communicating between controllers on a vehicle, the method comprising:
   communicating a first operation request from a first controller on the vehicle to a second controller on the vehicle, the first operation request being indicative of the second controller performing a first operation;
   attempting to perform the first operation by the second controller at a first time when the first operation cannot be performed by the second controller;
   determining, at the second controller, that the first operation cannot be performed at the first time;
   communicating an indication from the second controller to the first controller that the first operation request cannot currently be satisfied; and
   attempting to perform the first operation by the second controller again at a second time subsequent to the first time.

2. A non-transitory computer readable medium storing a computer program comprising computer program instructions, that, when performed by one or more processors, causes the method of claim 1 to be performed.

3. A control apparatus for controlling at least one feature of a vehicle, the control apparatus comprising:
communication means for receiving operation requests and transmitting responses to received operation requests; and
a controller configured to:
attempt to satisfy a received operation request at a first time when the received operation request cannot be satisfied,
determine that the received operation request cannot be satisfied at the first time,
cause the communication means to transmit an indication that the received operation request currently cannot be satisfied, and
attempt to satisfy the operation request at a second time subsequent to the first time.

4. The apparatus of claim 3, wherein the controller is configured to continue to repeatedly attempt to satisfy the received operation request for a predetermined period of time following the first time.

5. The apparatus of claim 4, wherein the controller is configured to cause the communication means to communicate an indication of an error in dependence on the controller not being able to satisfy the received operation request within the predetermined period of time.

6. The control apparatus of claim 3, wherein the controller is configured to control a device on the vehicle, and the received operation request is a request to enter an identified mode of operation of the device.

7. The apparatus of claim 6, wherein the controller is configured to determine whether the identified mode of operation is supported by the device at the first time and to cause the communication means to communicate the indication that the operation request cannot currently be satisfied in dependence on determining that the identified mode of operation is not supported by the device at the first time.

8. A system, comprising:
a first controller on a vehicle; and
a second controller on a vehicle;
wherein the first controller is configured to communicate to the second controller an operation request indicative of a first operation to be performed by the second controller; and
the second controller is configured to
attempt to perform the first operation at a first time when the first operation cannot be performed,
determine that the operation request cannot currently be satisfied,
communicate to the first controller an indication that the operation request cannot currently be satisfied, and
continue to attempt to perform the first operation at a second time subsequent to the first time.

9. The system of claim 8, wherein the second controller is configured to continue to attempt to perform the first operation for a predetermined period of time.

10. The system of claim 9, wherein the second controller is configured to communicate an indication of an error to the first controller if the second controller cannot satisfy the operation request within the predetermined period of time.

11. The system of claim 10, wherein the first controller is configured to output an indication of the error.

12. The system of claim 10, wherein the first controller is configured to cause an indication of the error to be output to an operator of the vehicle.

13. The system of claim 8, comprising a third controller and
wherein
the first controller is configured to communicate to the third controller a second operation request indicative of a second operation,
performance of the second operation by the third controller is dependent upon the first operation being performed by the second controller,
the third controller is configured to communicate an indication to the first controller that the second operation request cannot currently be satisfied during a time when the first operation has not been performed by the second controller, and
the third controller is configured perform the second operation after determining that the first operation has been performed by the second controller.

14. The system of claim 8, wherein the second controller is configured to control a device, and the first operation request is a request to enter an identified mode of operation of the device.

15. The system of claim 14, wherein the second controller is configured to determine whether the mode of operation is supported by the device.

16. The system of claim 14, wherein the second controller is configured to determine a status of one or more inputs to determine whether the first operation can be performed.

17. The system of claim 16, wherein the one or more inputs are one or more inputs provided to the device.

18. The system of claim 8, wherein the second controller is associated with a high voltage system of an electric vehicle.

19. A vehicle comprising a system as claimed in claim 8.

* * * * *